UNITED STATES PATENT OFFICE.

HENRY M. REICHENBACH AND SAMUEL CARL PASSAVANT, OF ROCHESTER, NEW YORK.

MANUFACTURE OF FLEXIBLE PHOTOGRAPHIC FILMS.

SPECIFICATION forming part of Letters Patent No. 458,663, dated September 1, 1891.

Application filed November 8, 1890. Serial No. 370,790. (No specimens.)

*To all whom it may concern:*

Be it known that we, HENRY M. REICHENBACH and SAMUEL CARL PASSAVANT, of Rochester, in the county of Monroe and State of New York, have invented certain new and useful Improvements in the Manufacture of Flexible Photographic Films; and we hereby declare the following to be such a full, clear, and exact description of the same as will enable one skilled in the art to which it appertains to practice the invention.

Our present invention relates to improvements upon or pertaining to the manufacture of flexible photographic films; and it consists in improvements hereinafter described and claimed.

Prior to our improvements in the preparation and manufacture of films of a fluid compound of nitro-cellulose and camphor to form the support or backing for a sensitive film for photographic purposes the nitro-cellulose and camphor were dissolved to form a clear fluid solution in a suitable solvent and the solution was spread in an even coating upon a rigid supporting-surface, such as plate-glass. The film thus formed, which we shall term the "film-support," was permitted to dry or harden, after which a layer or film of gelatino-argentic emulsion was applied to the surface of the film-support, and, after having been dried, the two, forming what we shall term a "photographic film," was stripped from the glass. In using a solution of nitro-cellulose and camphor in methyl-alcohol in the endeavor to produce film-supports to support and sustain the sensitized film it was found that in drying such film its exposed surface was liable to become pitted or covered more or less with small depressions and was otherwise objectionable. In seeking to remedy these defects we find that by the addition to the solution before spreading it on the rigid supporting-surface of a liquid or distillate prepared as hereinafter described the formation of irregularities in the surface of the film-support during the drying process and other objections are entirely avoided.

The liquid or distillate we purpose to employ is prepared by mixing a quantity of chloride of zinc with a quantity of fusel-oil (the preferred proportions being equal parts, by weight, of fusel-oil and zinc chloride) and heating this mixture for a period of several hours. We have found that boiling it for about ten hours, preferably with an inverted condenser, answers the purpose well. This mixture may then be washed with water, if desired, and is then distilled in the ordinary way, the distillate constituting the desired product or liquid.

We will first give the proportions of the component parts of the nitro-cellulose compound which we have used with good effect, and then describe the subsequent treatment.

The nitro-cellulose compound is obtained by dissolving twenty-two parts, by weight, of soluble nitro-cellulose and thirteen parts, by weight, of camphor in ninety-four parts, by weight, of wood-alcohol, and to this solution are added thirty-four parts of the distillate obtained as above described. In the preparation of this compound the nitro-cellulose is dissolved in the wood-alcohol and the camphor added, the solution being made in a closed vessel, which is subjected to heat and agitation to expedite the action of the wood-alcohol. After the solution is made the distillate is then added thereto.

To remove all unconvertible and extraneous substances and to clarify the solution, we prefer to filter it through fine cotton cloth.

We do not desire to be confined to the proportions of fusel-oil and zinc chloride in the preparation of the mixture from which the distillate is obtained, nor to the exact proportions of the component parts of the nitro-cellulose compound, as they can be varied without departing from our invention; but those given herein, as before stated, we have employed with successful results.

Having prepared the above-described fluid solution of nitro-cellulose and camphor in wood-alcohol and added the proper quantity of the distillate, the next operation is to spread the solution upon a rigid supporting-surface in a thin layer or film, care being taken to secure contact with such surface and prevent the formation of bubbles between it and the solution, after which the film, while still on such surface, is dried, thereby forming a flexible photographically-structureless film-support, which adheres firmly to the rigid supporting-surface.

The usual or any preferred means may be employed to prevent the too firm adherence of the film-support and the glass or other rigid supporting-surface on which it is formed. After the film-support has dried the film of gelatino-argentic emulsion is applied to its surface in the usual way, and, if desired, to prevent the emulsion when dried from separating from the film-support and forming blisters the surface of said film-support may before the application of the emulsion be washed with a solution of silicate of potash or silicate of soda or similar binding material. After the film of gelatino-argentic emulsion has dried the film is stripped from the rigid supporting-surface, preferably by detaching one end and applying it to a winding device.

The depositing and spreading of the fluid solution is best accomplished by mechanical devices, substantially as illustrated in Letters Patent No. 417,202, granted December 10, 1889, to the Eastman Dry Plate and Film Company, which embodies a glass or other rigid supporting-surface and a traveling carriage thereon, a hopper for the fluid solution, and a spreader; and as this forms no part of our invention we do not deem it necessary to illustrate said apparatus herein.

The film of gelatino-argentic emulsion may be spread upon the film-support by the same mechanism employed for spreading the fluid solution upon the rigid supporting-surface or by any other means. After the film of gelatino-argentic has been dried the photographic film is stripped from the support by means of a winding device, such as a roller mounted upon a carriage traversing longitudinally the rigid supporting-surface.

We do not claim as our invention the process of making flexible photographic films, which consists in flowing liquid nitro-cellulose upon a plate or support, drying the same, then coating with a photographically-sensitive material, and after drying said coating removing the film of collodion and sensitive material thus formed from its original support, nor the employment of a binding solution between the film-support and the emulsion, as these form no part of our present invention.

While our invention relates to the manufacture of photographic film, it is obvious that the distillate described could be employed in the making of nitro-cellulose compounds generally, and we therefore do not desire to be confined to its use in the process described.

We claim as our invention—

1. The hereinbefore-described improvement in the art of forming flexible film-supports, which consists in adding a distillate obtained from zinc chloride and fusel-oil to a fluid solution of nitro-cellulose and camphor and subsequently depositing and spreading such solution upon a rigid supporting-surface and drying it.

2. The hereinbefore-described improvement in the art of forming flexible film-supports, which consists in combining wood-alcohol, camphor, nitro-cellulose, and a distillate obtained from zinc chloride and fusel-oil to form a fluid solution and then depositing and spreading the latter upon a supporting-surface and drying the same.

3. As an improvement in the art of producing flexible film-supports, the hereinbefore-described improved step in the process, which consists in making a mixture of wood-alcohol, a distillate obtained from zinc chloride and fusel-oil, nitro-cellulose, and camphor in a fluid solution for spreading in a thin film upon a support.

4. As an improvement in the art of producing flexible film-supports, the addition of a distillate obtained from zinc choride and fusel-oil to a fluid solution of nitro-cellulose and camphor in a liquid solvent and the subsequent depositing and spreading of said solution in a film upon a supporting-surface and drying the film upon the latter.

5. An improvement in the art of producing flexible film-supports with smooth surfaces, the same consisting in adding a distillate obtained from zinc chloride and fusel-oil to nitro-cellulose, camphor, and a fluid solvent and subsequently spreading the fluid solution in a thin layer or film upon a supporting-surface and drying the film preliminary to the application of a film of gelatino-argentic emulsion.

6. A nitro-cellulose compound composed of wood-alcohol, camphor, nitro-cellulose, and a distillate obtained from zinc chloride and fusel-oil, as set forth.

7. The improved process of forming nitro-cellulose compounds, consisting in adding to a mixture of wood-alcohol, camphor, and nitro-cellulose a distillate obtained from zinc chloride and fusel-oil.

HENRY M. REICHENBACH.
SAMUEL CARL PASSAVANT.

Witnesses:
WALTER S. HUBBELL,
CHARLES H. BAILEY.